(12) United States Patent
Lee

(10) Patent No.: US 9,709,371 B1
(45) Date of Patent: Jul. 18, 2017

(54) AMMUNITION INSPECTING SYSTEM

(71) Applicant: POONGSAN CORPORATION, Pyeongtaek-si, Gyeonggi-do (KR)

(72) Inventor: Dong Hee Lee, Busan (KR)

(73) Assignee: POONGSAN CORPORATION, Pyeongtaek-si (KR)

( * ) Notice: Subject to any disclaimer, the term of this patent is extended or adjusted under 35 U.S.C. 154(b) by 0 days.

(21) Appl. No.: 15/337,370

(22) Filed: Oct. 28, 2016

(30) Foreign Application Priority Data

Dec. 28, 2015 (KR) .................. 10-2015-0187040

(51) Int. Cl.
 *H04N 9/47* (2006.01)
 *F42B 35/00* (2006.01)
 *H04N 5/247* (2006.01)
 *H04N 5/225* (2006.01)

(52) U.S. Cl.
 CPC ........... *F42B 35/00* (2013.01); *H04N 5/2256* (2013.01); *H04N 5/247* (2013.01)

(58) Field of Classification Search
 None
 See application file for complete search history.

(56) References Cited

U.S. PATENT DOCUMENTS

| 4,923,066 A * | 5/1990 | Ophir ................ F42B 35/00 209/538 |
| 6,959,108 B1 * | 10/2005 | Bartelt ................ G06T 7/0004 348/125 |
| 8,090,223 B1 * | 1/2012 | Prokoski ................ F42B 35/00 382/100 |
| 8,983,173 B2 | 3/2015 | Beach et al. |

FOREIGN PATENT DOCUMENTS

| JP | 2009-031060 | 2/2009 |
| JP | 2009-168589 | 7/2009 |
| JP | 2013-087967 | 5/2013 |
| KR | 10-2001-0099300 | 11/2001 |

(Continued)

OTHER PUBLICATIONS

English translation of 2013-087967.

(Continued)

*Primary Examiner* — Chikaodili E Anyikire
(74) *Attorney, Agent, or Firm* — Antionio Ha; U.S. Patent, LLC

(57) ABSTRACT

An ammunition inspecting system comprises a tray wheel, a plurality of tray units on the tray wheel, a tray inserting pusher seating ammunition cartridges on the tray units, an ammunition side image capturing module facing an upper portion of the tray wheel, an ammunition actuating roller approaching a tray unit, rotating a particular ammunition cartridge on the tray unit, and then escaping off, an ammunition discharging module adjacent to a start point of the tray wheel to receive and convey the ammunition cartridges from the tray units, an ammunition bottom image capturing module at a side of the upper portion and including one or more cameras vertically image-capturing bottom surfaces of the ammunition cartridges, and an ammunition recovering module at a side of the upper portion and pushing the ammunition cartridges out of the tray units.

2 Claims, 12 Drawing Sheets

(56) References Cited

FOREIGN PATENT DOCUMENTS

KR    10-2005-0083360    8/2005
KR    10-2014-0070908    6/2014

OTHER PUBLICATIONS

English translation of 10-2014-0070908.
English translation of 2009-031060.
English translation of 2009-168589.
English translation of 10-2001-0099300.
English translation of 10-2005-0083360.

* cited by examiner

AMMUNITION INSPECTING SYSTEM

CROSS-REFERENCE TO RELATED APPLICATIONS

This patent application claims priority under 35 U.S.C. §119 to Korean Patent Application No. 10-2015-0187040, filed on Dec. 28, 2015, in the Korean Intellectual Property Office, the disclosure of which is incorporated by reference herein in its entirety.

TECHNICAL FIELD

The present disclosure concerns inspection of ammunition, and more specifically, to an ammunition inspecting system inspecting ammunition cartridges based on images captured for the overall surface of the ammunition cartridges by rotating and revolving the ammunition cartridges.

DISCUSSION OF RELATED ART

Machine vision (MV) is the technology and methods used to provide imaging-based automatic inspection and analysis for such applications as automatic inspection, process control, and robot guidance in industry. A similar concept to MV is computer vision (CV) that deals with acquiring, processing, analyzing and understanding digital images from products.

Such MV or CV has various applications, including automatic product inspection, packaging inspection, surface inspection, and detecting defects or blemishes on products, etc.

Meanwhile, it might be tricky to detect and inspect a goad deal of ammunition and screen out defective or different types of ammunition. MV, CV, or its similar image processing apparatuses may be adopted to conduct such tasks.

SUMMARY

According to an embodiment of the present invention, an ammunition inspecting system comprises a disk-shaped tray wheel having an outer circumferential surface rotated in a vertical direction by a horizontal rotation shaft, a plurality of tray units provided on the outer circumferential surface of the tray wheel, a tray inserting pusher seating ammunition cartridges on the tray units, an ammunition side image capturing module disposed to face the outer circumferential surface of an upper portion of the tray wheel, an ammunition actuating roller approaching a tray unit loading a particular ammunition cartridge image-captured by the ammunition side image capturing module, rotating the particular ammunition cartridge, and then escaping off, an ammunition discharging module disposed adjacent to a start point of the outer circumferential surface of a lower portion of the tray wheel to receive and convey the ammunition cartridges dropping from the tray units, an ammunition bottom image capturing module provided at a side of the upper portion of the tray wheel and including one or more cameras vertically image-capturing bottom surfaces of the ammunition cartridges seated on the tray units, and an ammunition recovering module provided at a side of the upper portion of the tray wheel and pushing the ammunition cartridges out of the tray units in a direction perpendicular to a revolving direction thereof and perpendicular to an image capturing direction of the ammunition side image capturing module.

The ammunition side image capturing module may include at least one first camera image-capturing the particular ammunition cartridge rotated as the ammunition actuating roller approaches, a first ammunition side light assisting in the image-capturing of the first camera, at least one second camera image-capturing the particular ammunition cartridge after the ammunition actuating roller escapes off and the particular ammunition cartridge undergoes a predetermined revolution, and a second ammunition side light assisting in the image capturing of the second camera.

The tray inserting pusher may be provided adjacent to the start point of the outer circumferential surface of the upper portion of the tray wheel. The ammunition bottom image capturing module may include a primer camera and a primer edge camera arranged to image-capture, at different focal lengths, bottom surfaces of ammunition cartridges seated on different tray units. The ammunition side image capturing module may include a line scan camera, a bullet camera, a casing camera, a discoloring camera, and an annealing camera image-capturing an overall outer circumferential surface of the particular ammunition cartridge while the particular ammunition cartridge rotates. The ammunition side image capturing module may further include a heterogeneous ammunition camera image-capturing a portion of the outer circumferential surface after the particular ammunition cartridge stops rotating and then undergoes the predetermined revolution.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter exemplary embodiments of the present disclosure will be described in detail with reference to the accompanying drawings. The present disclosure, however, may be modified in various different ways, and should not be construed as limited to the embodiments set forth herein. The same reference denotations may be used to refer to the same or substantially the same elements throughout the specification and the drawings. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
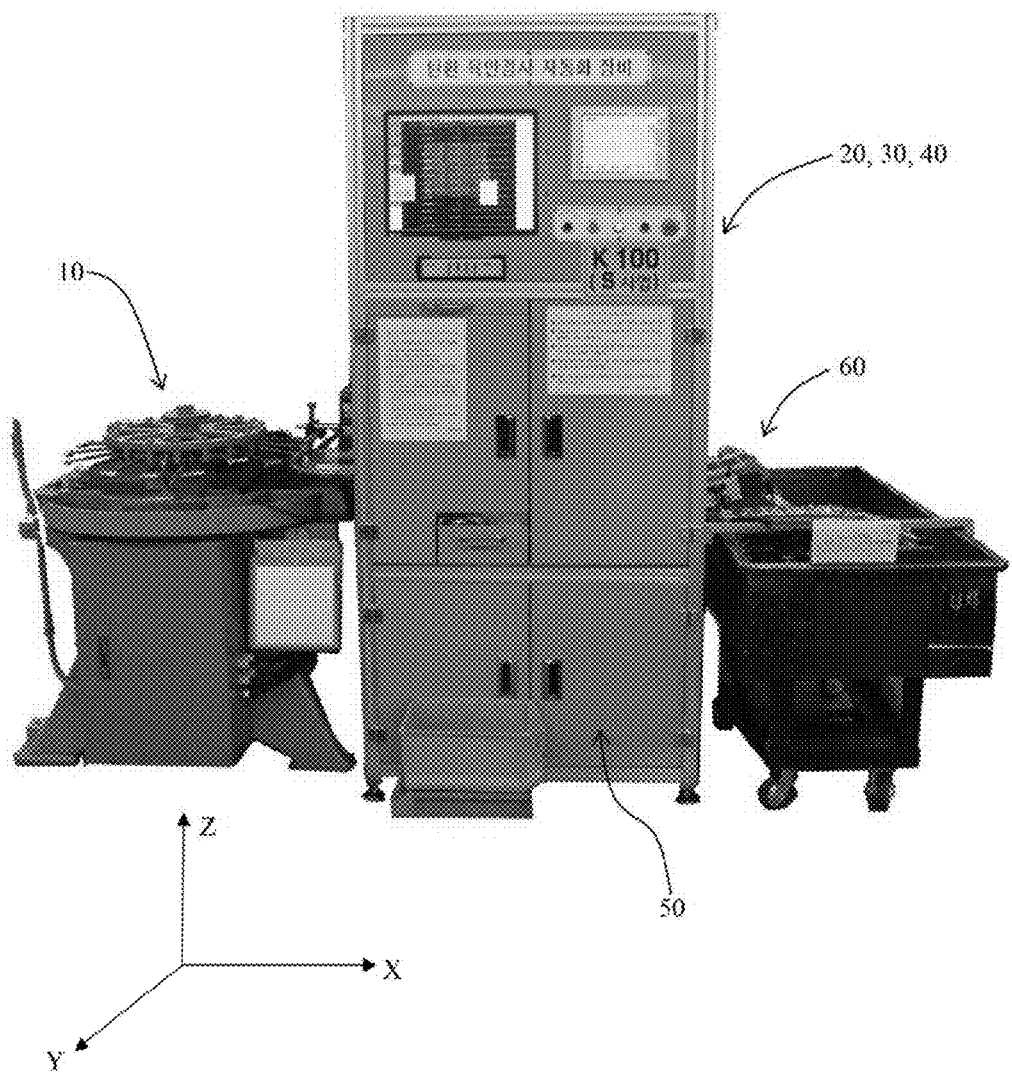
FIG. 1 is a front perspective view illustrating an ammunition inspecting system according to an embodiment of the present disclosure.

As used herein, the term "X axis," "X-axis direction," or "X direction" may refer to a left-right direction of the ammunition inspecting system, the term "Y axis," "Y-axis direction," or "Y direction" may refer to a front-rear direction of the ammunition inspecting system, which is substantially perpendicular to the X direction, and the term "Z axis," "Z-axis direction," or "Z direction" may refer to a bottom-top direction of the ammunition inspecting system, which is substantially perpendicular to the X or Y direction, as indicated in FIG. 1, for example.

Figure 2:
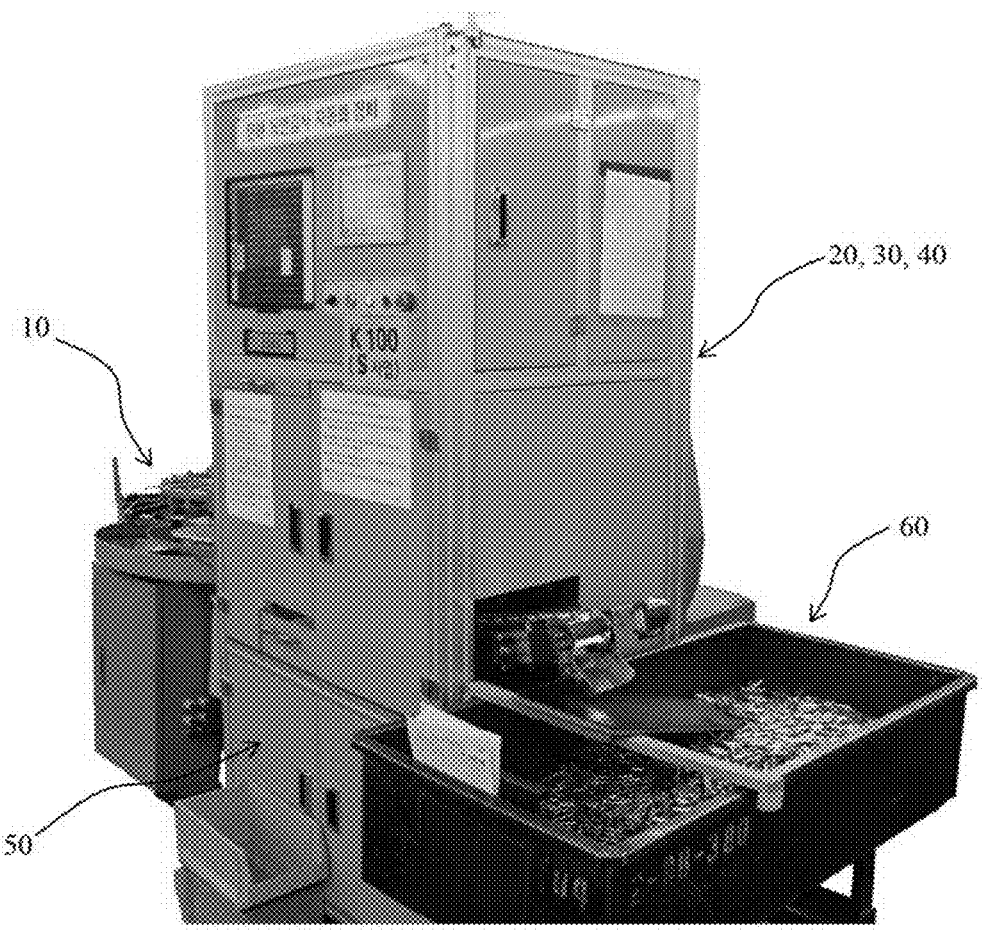
FIG. 2 is a side perspective view illustrating an ammunition inspecting system according to an embodiment of the present disclosure.
Figure 3:
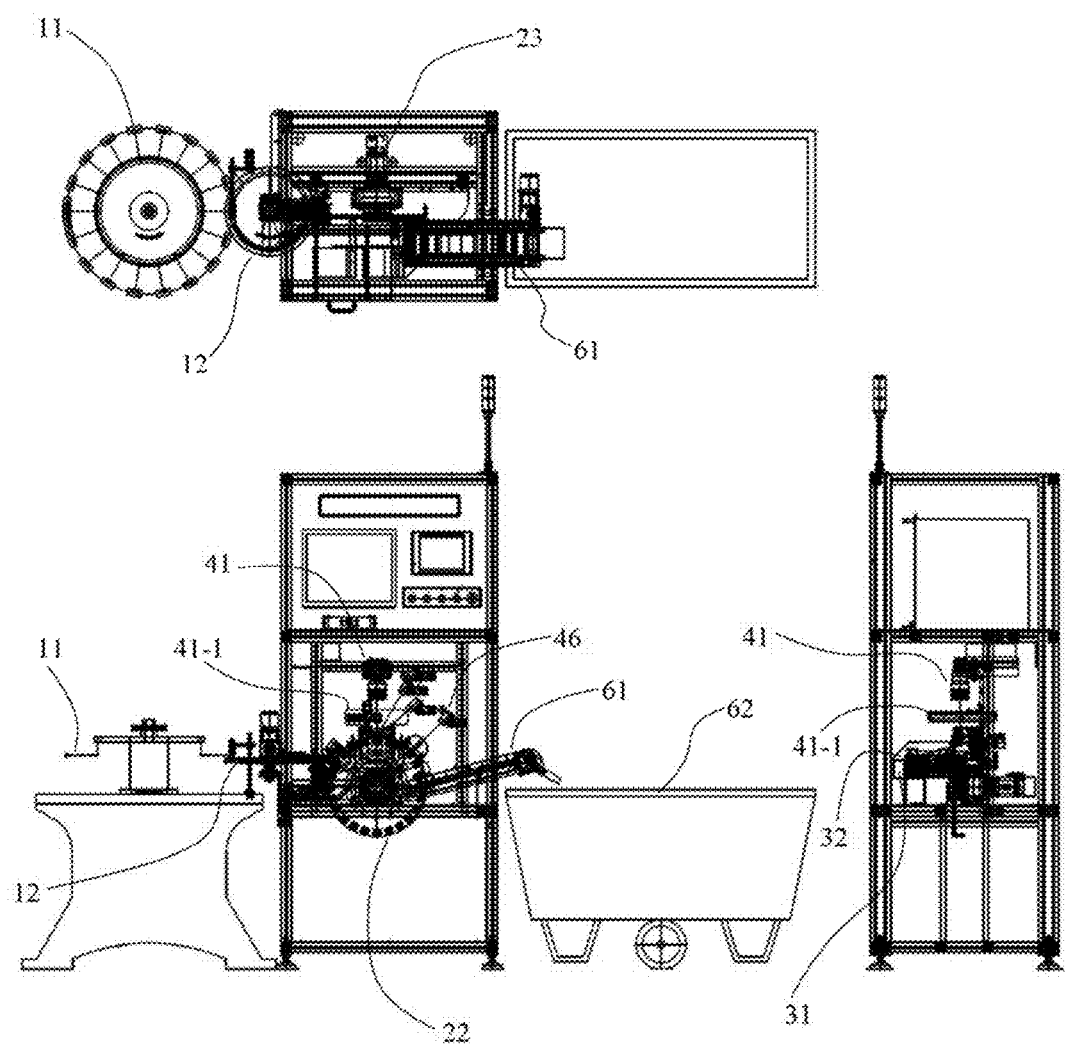
FIG. 3 illustrates an ammunition inspecting system as viewed from above, front, and side according to an embodiment of the present disclosure.

FIG. 1 is a front perspective view illustrating an ammunition inspecting system according to an embodiment of the present disclosure. FIG. 2 is a side perspective view illustrating an ammunition inspecting system according to an embodiment of the present disclosure. FIG. 3 illustrates an ammunition inspecting system as viewed from above, front, and side according to an embodiment of the present disclosure.

Referring to FIGS. 1 to 3, the ammunition inspecting system may include a plurality of working modules. The working modules may include an ammunition feeder 10, a tray module 20, an ammunition bottom image capturing module 30, an ammunition side image capturing module 40, an ammunition recovering module 50, and an ammunition discharging module 60.

A task or process may be performed in order of the ammunition feeder 10, the tray module 20, and the ammunition discharging module 60. The ammunition bottom image capturing module 30, the ammunition side image capturing module 40, and the ammunition recovering module 50 may perform their respective tasks or processes in the tray module 20.

The working modules may operate according to common references for operational directions. For example, ammunition cartridges (or rounds of ammunition) may be conveyed from left to right as viewed from the drawings, e.g., in the X direction. The ammunition cartridges may be carried on an upper semi-circular track of a tray wheel 22 included in the tray module 20 which rotates clockwise.

The tray wheel 22 may be disk-shaped or a disk. The tray wheel 22 may include a rigid body formed of, e.g., iron. An ammunition cartridge seated on a tray unit 21 may revolve along an orbit. The orbit at a position of a revolving ammunition cartridge may be tangential to the outer circumference of the disk. A direction of image-capturing a side surface of the ammunition cartridge may be a direction of the radius of the disk, and a direction of image-capturing a bottom surface of the ammunition cartridge and a direction of recovering the ammunition cartridge may be perpendicular to a surface of the disk. The working modules may follow the above directional references.

The tray wheel 22 may rotate stepwise, e.g., in predetermined incremental steps.

The ammunition feeder 10 may include a feeding shuttle 11, a horizontal rotating plate 12, a feeding pusher 13, a feeding magazine 14, and a tray inserting pusher 15.

The tray module 20 may include a tray unit 21, an idle roller 21-1, an actuating roller inducing surface 21-2, a bullet seating depression 21-3, a casing seating depression 21-4, a tray wheel 22, a tray wheel actuating motor 23, an ammunition actuating roller 24, and an ammunition supporting roller 25.

The ammunition bottom image capturing module 30 may include a primer camera 31, a first ammunition bottom light 31-1, a printer edge camera 32, and a second ammunition bottom camera 32-1

The ammunition side image capturing module 40 may include a line scan camera 41, a first ammunition side light 41-1, a bullet-casing camera 42, a discoloring-extraction groove camera 43, an annealing camera 44, a heterogeneous ammunition camera 45, and second ammunition side light 45-1.

The ammunition recovering module 50 may include a bottom defective ammunition collector 51, a first side defective ammunition collector 52, and a second side defective ammunition collector 53.

The ammunition discharging module 60 may include an ammunition discharging conveyor 61 and a normal ammunition basket 62.

Ammunition cartridges may be sorted and fed to the tray module 20 one by one through the ammunition feeder 10 including the horizontal rotating plate 12. The tray wheel 22 of the tray module 20 may rotate to carry the ammunition cartridges along an orbit. The ammunition cartridges are illuminated by an ammunition bottom light and ammunition side light, and image capturing their primers and side surfaces is performed while being carried by the tray wheel 22. An ammunition cartridge is rotated and positioned at a particular point of the tray wheel 22.

A plurality of tray units 21 may be arranged on the tray wheel 22. An ammunition cartridge may be rotated and positioned at a predetermined point on an orbit where the tray units 21 pass or revolve, and an overall outer circumferential surface of the ammunition cartridge is image-captured. The predetermined point on the orbit may be, e.g., a top dead center of the rotating track or the orbit of the tray wheel 22 or an apex of the disk.

Since each inspecting stage may be performed at a different image-capturing position and image-capturing angle, ammunition cartridges may be individually screened or recovered in an easier manner depending on inspection items.

Cameras for inspecting images, e.g., the line scan camera 41, the bullet-casing camera 42, the discoloring-extraction groove camera 43, the annealing camera 44, the primer camera 31, the primer edge camera 32, and the heterogeneous ammunition camera 45, may individually or distinctly capture images for their respective inspection items. The inspection items may include line scan, bullet, casing, discoloring, annealing, primer, waterproof, and heterogeneous ammunition. The captured images may be stored in a database (not shown) of a control system (not shown). The database or the control system may be included in the ammunition inspecting system or provided separately from the ammunition inspecting system. The control system may further include an image recognition processor (not shown). The control system may include, but is not limited to, a controller, a control computer, or a processor controlling at least one operation of at least one component of the ammunition inspecting system or enabling comparison, contrast, or recognition, or any other processing in association or separately from the database or the image recognition processor. The captured images may be recognized, compared, or contrasted electronically by the image recognition processor or manually at raw eyes to automatically screen normal ammunition cartridges and defective ammunition cartridges.

When an ammunition cartridge having passed through a predetermined point on the orbit is determined to be nonconforming (e.g., failing to meet a predetermined standard or reference that may be stored in the database and may be processed by the processor) based on a result of inspection of images obtained at a prior image-capturing point, the ammunition recovering module 50 is operated to screen out the nonconforming ammunition cartridge.

Ammunition cartridges passing the image inspection are discharged by the ammunition discharging module 60. For example, ammunition cartridges meeting the predetermined standard or reference may be discharged or gathered by the ammunition discharging module 60. The ammunition discharging module 60 may be positioned adjacent to a start point of an outer circumferential surface of a lower portion of the tray wheel 22. The ammunition discharging module 60 may gather ammunition cartridges dropping or escaping off. For example, ammunition cartridges naturally dropping off a rightmost end of the tray wheel 22 may be received and carried by the ammunition discharging conveyor 61 to the normal ammunition basket 62.

Figure 4:
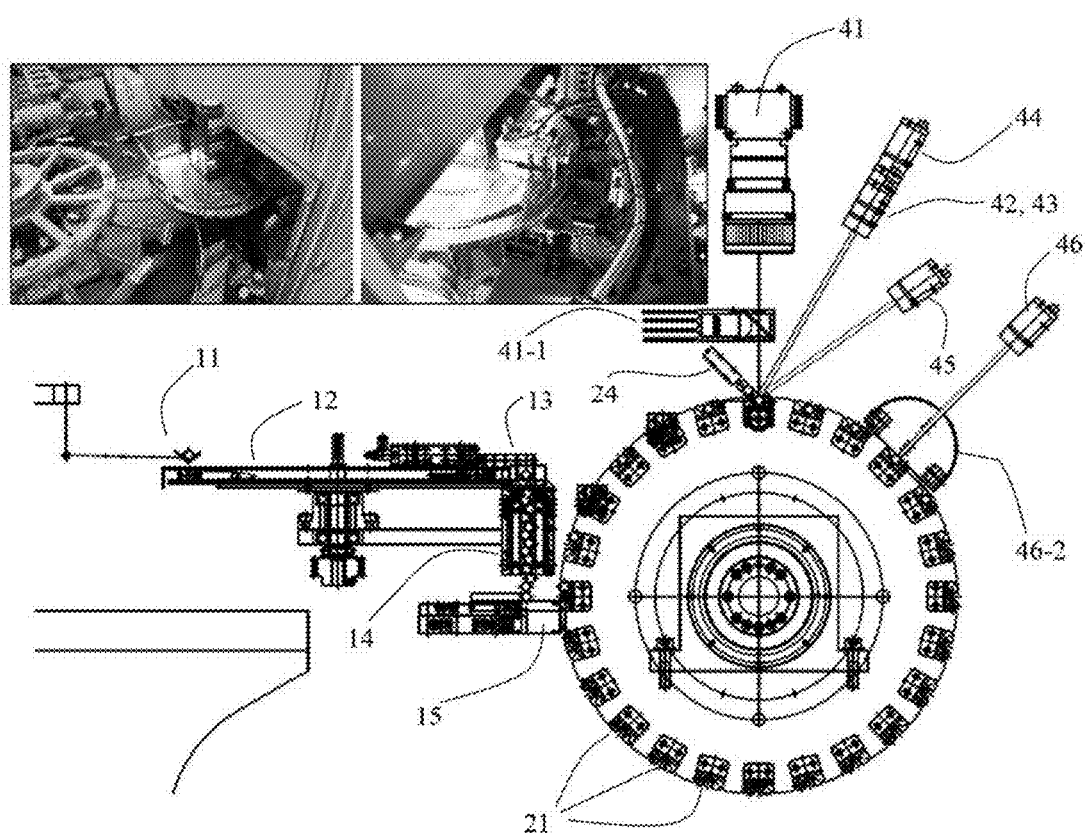
FIGS. 4 and 5 illustrate some elements of an ammunition inspecting system according to an embodiment of the present disclosure.
Figure 5:
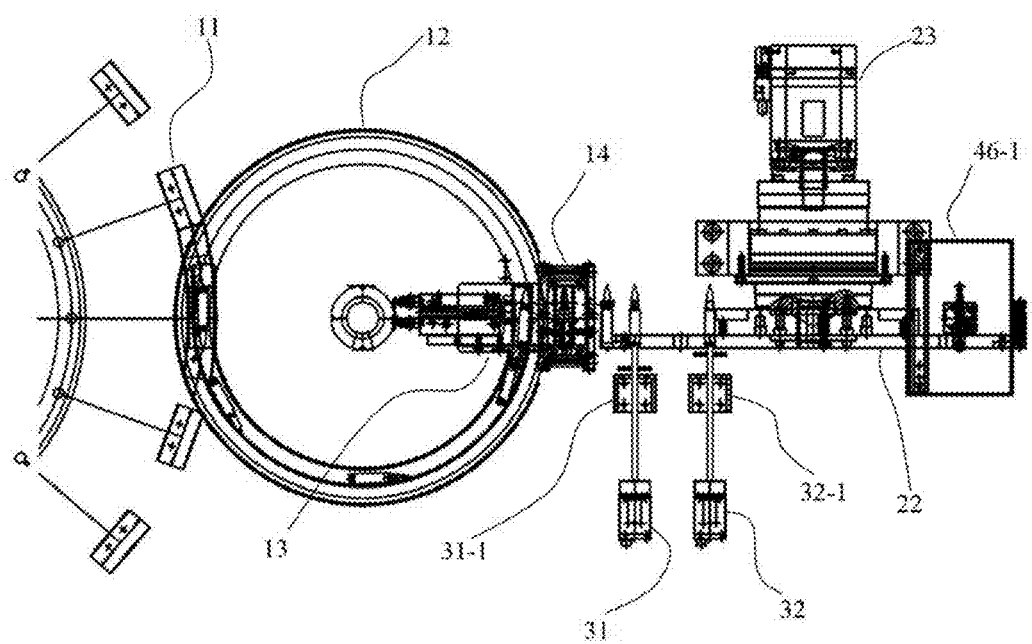
Figure 6:
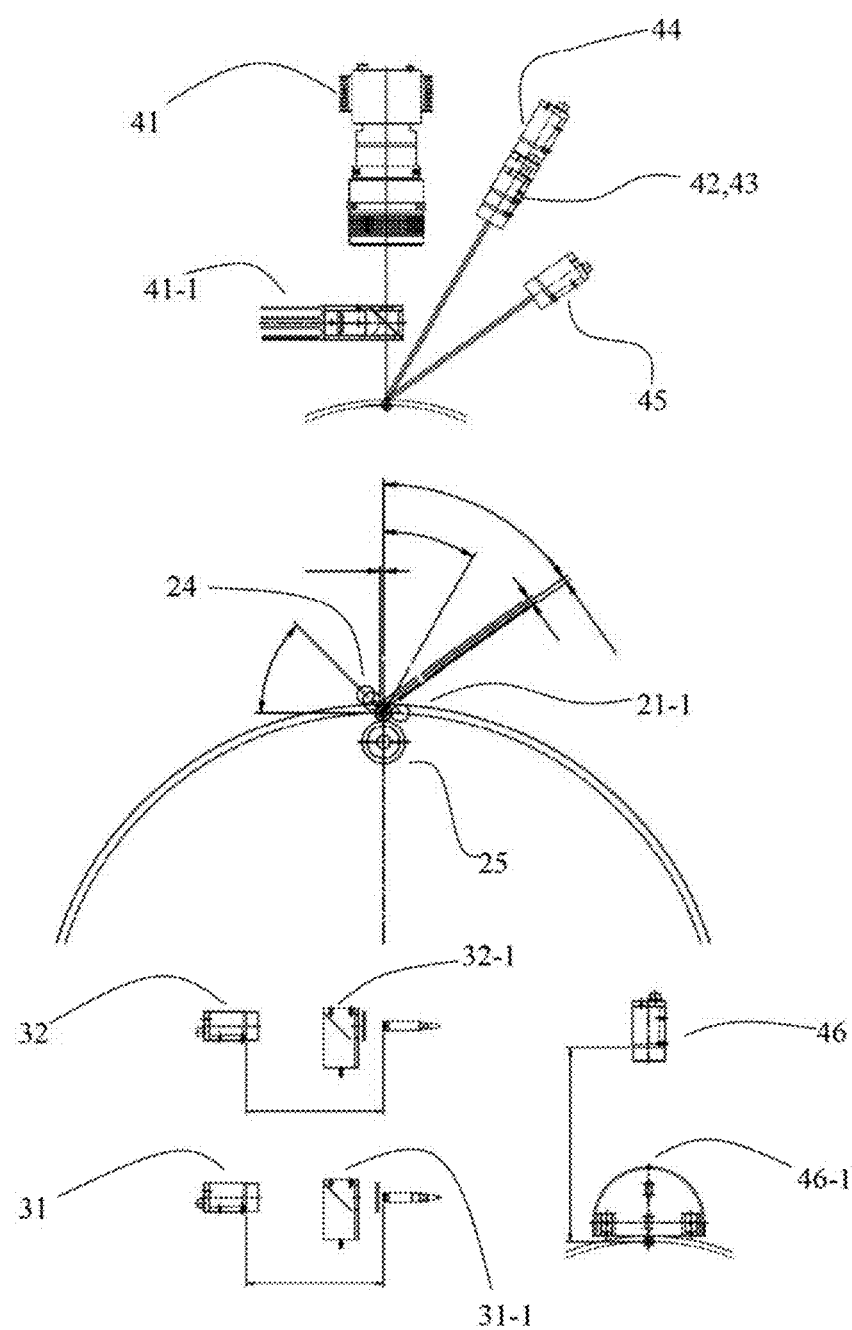
FIG. 6 is a view illustrating a configuration of cameras and lights around a tray wheel of an ammunition inspecting system according to an embodiment of the present disclosure.
Figure 7:
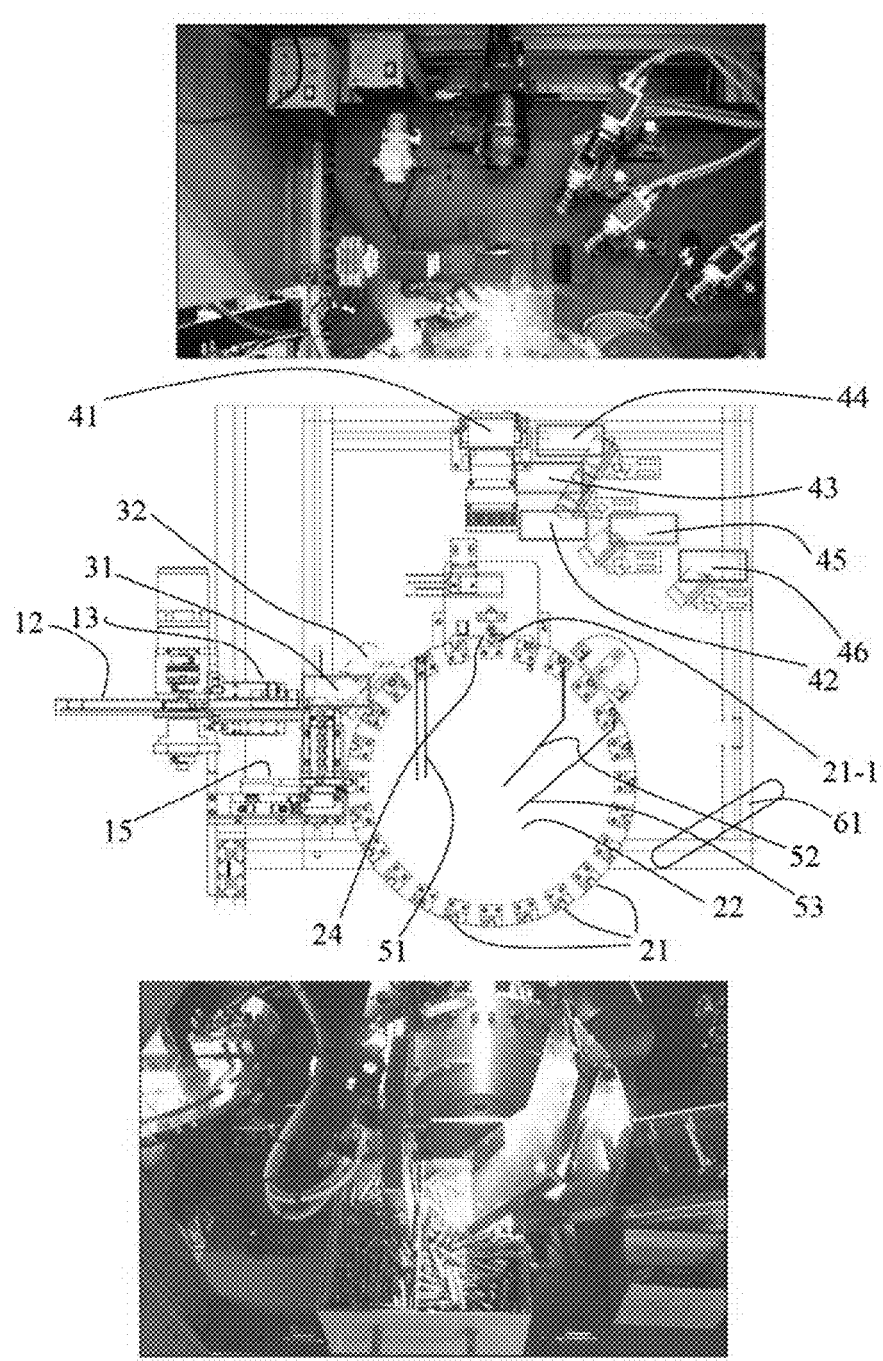
FIG. 7 illustrates some elements of a tray wheel of an ammunition inspecting system according to an embodiment of the present disclosure.
Figure 8:
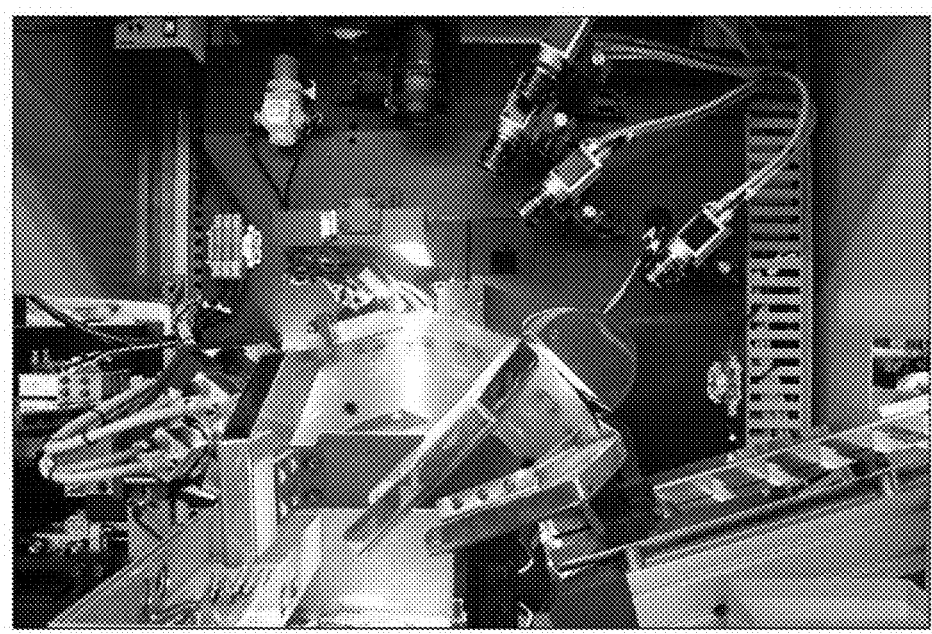
FIG. 8 illustrates a structure in which an ammunition cartridge rotates on a tray unit at an apex of a tray wheel of an ammunition inspecting system according to an embodiment of the present disclosure.
Figure 8:
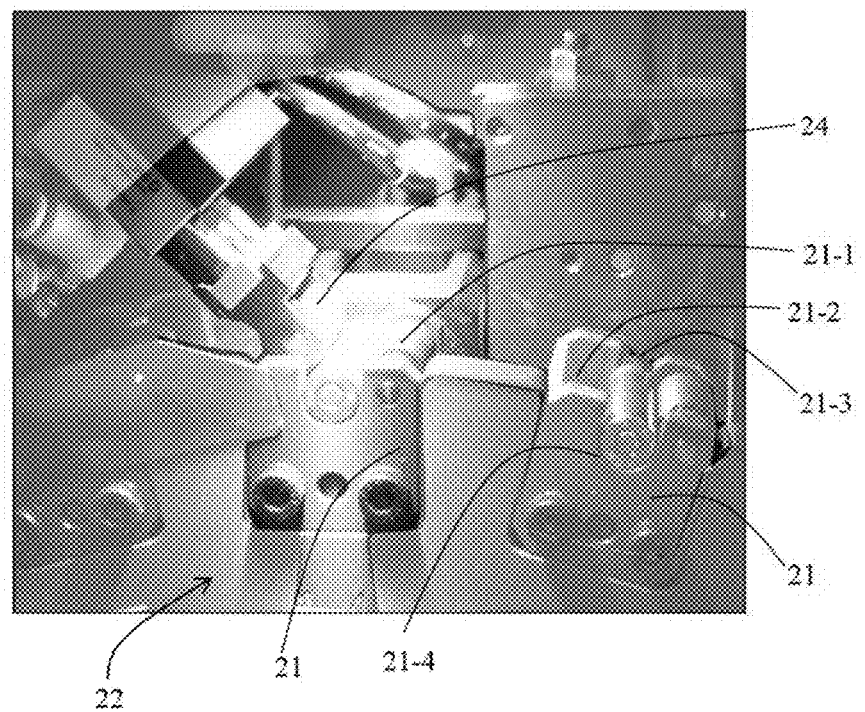

FIGS. 4 and 5 illustrate some elements of an ammunition inspecting system according to an embodiment of the present disclosure. FIG. 6 is a view illustrating a configuration of cameras and lights around a tray wheel of an ammunition inspecting system according to an embodiment of the present disclosure. FIG. 7 illustrates some elements of a tray wheel of an ammunition inspecting system according to an embodiment of the present disclosure. FIG. 8 illustrates a structure in which an ammunition cartridge rotates on a tray unit at an apex of a tray wheel of an ammunition inspecting system according to an embodiment of the present disclosure.

Conveyance of an ammunition cartridge may include feeding the ammunition cartridge two horizontal rotations, placing the ammunition cartridge onto a leftmost tray unit 21 on the tray wheel 22 by vertically descending and horizontally moving, clockwise upper semi-circular rotation (e.g., 180-degree rotation) by the rotation of the tray wheel 22, recovering the ammunition cartridge escaping from the tray unit 21 and dropping by gravity at a rightmost end of the tray wheel 22, and discharging the ammunition cartridge by carrying the ammunition cartridge in an inclined and horizontal direction. While the tray wheel 22 rotates, i.e., the ammunition cartridge revolves, collectors, e.g., the bottom defective ammunition collector 51, the first side defective ammunition collector 52, and the second side defective ammunition collector 53, are operated in the Y-axis direction, which is perpendicular to an orbit plane (e.g., a XZ plane) of the ammunition cartridge, to recover defective, nonconforming, or heterogeneous ammunition cartridges, as shown in FIGS. 7 and 8.

FIG. 4 illustrates the ammunition feeder 10 as viewed from inside or outside a harness of the ammunition inspecting system. The tray inserting pusher 15 of the ammunition feeder 10 is provided adjacent to a start point of an outer circumferential surface of an upper portion of the tray wheel 22. Unlike the feeding pusher 13, the tray inserting pusher 15 does not hit away ammunition cartridges but rather gently presses an ammunition cartridge on a tray unit 21 to be firmly fitted into the bullet seating depression 21-3 and casing seating depression 21-4 of the tray unit 21.

Referring to FIGS. 7 and 8, tray units 21 are fitted and coupled at even intervals to an outer circumferential edge of the tray wheel 22. Each tray unit 21 may include an idle roller 21-1, an actuating roller inducing surface 21-2, a bullet seating depression 21-3, and a casing seating depression 21-4. The idle roller 21-1 may function to support the rotation of an ammunition cartridge on the tray unit 21 that is caused by the ammunition actuating roller 24. The actuating roller inducing surface 21-2 guides the ammunition actuating roller 24 to inclinedly come in the tray unit 21. The bullet seating depression 21-3 and the casing seating depression 21-4 may be formed with a predetermined width and depth to firmly hold the bullet and casing, respectively, of the ammunition cartridge that are different in diameter from each other.

The tray wheel 22 may be a disk-shaped member whose outer circumferential surface is rotated clockwise with respect to a horizontal rotation shaft. The outer circumferential surface of the tray wheel 22 may orbit the horizontal rotation shaft. The tray wheel 22 may be actuated by the tray wheel actuating motor 23. For example, the tray wheel 22 may rotate clockwise with respect to the Y axis which is a rotation axis, and thus, ammunition cartridges may revolve with respect to a center of the tray wheel 22. In other words, the ammunition cartridges may orbit the center of the tray wheel 22.

The ammunition actuating roller 24 may be separately positioned away from the tray wheel 22. The ammunition supporting roller 25 may also be separately positioned away from the tray wheel 22. The ammunition actuating roller 24 may approach a predetermined point for image-capturing an ammunition cartridge and gives the ammunition cartridge exactly one turn and then moves back to allow for approach of a next tray unit 21. The predetermined point for image-capturing an ammunition cartridge may be, e.g., a tray unit 21 carrying a particular ammunition cartridge focused by the ammunition side image capturing module 40.

The ammunition side image capturing module 40 enables 360-degree image-capturing of an outer circumferential surface of an ammunition cartridge. In other words, the ammunition side image capturing module 40 may image-capture the overall outer circumferential surface of the ammunition cartridge.

The ammunition actuating roller 24 may approach the tray unit 21 at an apex of the revolution orbit of the tray wheel 22 and contact an outer circumferential surface of the casing of the ammunition cartridge to rotate the ammunition cartridge.

As the ammunition cartridge is rotated in a middle area of three points where the ammunition cartridge is supported by the idle roller 21-1, the ammunition actuating roller 24, and the ammunition supporting roller 25, the overall 360-degree outer circumferential surface of the ammunition cartridge may be exposed and image-captured by some cameras of the ammunition side image capturing module 40. For example, the ammunition cartridge may be rollably or rotatably supported by the rollers 21-1, 24, and the 25 at the three points thereof and may be rotated by at least one of the rollers 21-1, 24, and 25. For example, the ammunition supporting roller 25 may slightly descend and then ascend whenever the tray wheel 22 rotates stepwise, e.g., in a predetermined incremental steps to, together with the idle roller 21-1 and the ammunition actuating roller 24, support the ammunition cartridge fitted into the bullet seating depression 21-3 and the casing seating depression 21-4 at three points. Thus, the ammunition cartridge may be subjected to the rollable support at the apex of the orbit by the rollers 21-1, 24, and 25 and is prevented from escaping or dropping off the seating depressions 21-3 and 21-4 on the orbit except for the apex of the orbit. Further, the ammunition cartridge may be easily and quickly image-captured by the cameras provided over the tray wheel 22 at exact positions and angles while a wide view is secured.

As such, the rotation of the ammunition cartridge enables image capture of the whole outer circumferential surface of the ammunition cartridge.

Each image capturing module is described below in greater detail.

The ammunition bottom image capturing module 30 may be provided at a side of an upper portion of the tray wheel 22 and includes one or more cameras for vertically image-capturing the bottom surface of the ammunition cartridge seated on the tray unit 21.

For example, the ammunition bottom image capturing module 30 may include a primer camera 31 and a primer edge camera 32 having different focal lengths and arranged to image-capture the bottom surface of ammunition cartridges seated on different tray units 21. The primer camera 31 and the primer edge camera 32 each may include a light. For example, the primer camera 31 and the primer edge camera 32, respectively, may include a first ammunition bottom light 31-1 and a second ammunition bottom camera 32-1. The primer camera 31 and the primer edge camera 32 may form a coaxial light path without interrupting the ammunition side image capturing module 40 or lights thereof.

The ammunition side image capturing module 40 is disposed to face the outer circumferential surface of the upper portion of the tray wheel 22.

The ammunition side image capturing module 40 may include at least one first camera image-capturing a particular ammunition cartridge rotated as the ammunition actuating roller 24 approaches the ammunition cartridge, a first ammunition side light 41-1 assisting the first camera in image capturing, at least one second camera image-capturing the particular ammunition cartridge before and/or after a predetermined revolution of the particular ammunition cartridge before and/or after the ammunition actuating roller 24 escapes, and a second ammunition side light 45-1 assisting the second camera in image-capturing.

The ammunition recovering module 50 may be similar in structure to the ammunition bottom image capturing module 30. The ammunition recovering module 50 may be provided at a side of the upper portion of the tray wheel 22 and push an ammunition cartridge out of a tray unit 21 in a direction substantially perpendicular to a revolution direction of the ammunition recovering module 50 or substantially perpendicular to an image-capturing direction of the ammunition side image capturing module 40.

The collectors, e.g., the bottom defective ammunition collector 51, the first side defective ammunition collector 52, and the second side detective ammunition collector 53, as shown in FIG. 7, may include a hydraulic pneumatic actuator disposed behind the tray wheel 22, a drop guiding plate disposed before the tray wheel 22, and a recovery basket disposed thereunder.

The ammunition side image capturing module 40 may include a line scan camera 41, a bullet-casing camera 42, a discoloring-extraction groove camera 43, and an annealing camera 44 that may image-capture an overall outer circumferential surface of a particular ammunition cartridge while the ammunition cartridge rotates. The ammunition side image capturing module 40 may further include a heterogeneous ammunition camera 45 that may image-capture a side portion of the ammunition cartridge after the ammunition cartridge stops rotating and then undergoes a predetermined revolution.

The present disclosure is not limited to the type or position of each of the above-described cameras or lights. Whether to share the lights or the point where an ammunition cartridge rotates may be determined depending on whether the whole of an outer circumferential surface of the ammunition cartridge needs to be image-captured or image-capturing a portion of the outer circumferential surface suffices.

While going through the conveyance on tray units, image-capturing, and recovery, an ammunition cartridge may be exposed to remaining cameras of the ammunition bottom image capturing module 30 and/or the ammunition side image capturing module 40 at points before and behind the apex of the tray wheel 22.

At each exposed point, each camera and lights provided for the camera may be moved in a predetermined view, slightly, e.g., in such a degree as to capture an exactly focused image of an ammunition cartridge without interrupting the conveyance of the ammunition cartridge.

During the process, information on the captured images may be stored in the database (not shown) as digital information. The database may previously store reference information for comparison or contrast with the captured images. The reference information may include at least one reference image. The processor (not shown) may compare or contrast the reference information with the captured images or information on the captured images to produce a reference for automatic or intelligent inspection or determination or enable the focus of the cameras or the angle or brightness of the lights to be modified or changed. The captured images, together with a menu, may be steadily displayed on a monitor, allowing a worker easier management.

Figure 9:
FIG. 9 is a view illustrating a captured image for inspecting a bullet and casing in an ammunition inspecting system according to an embodiment of the present disclosure.

FIG. 9 is a view illustrating a captured image for inspecting a bullet and casing in an ammunition inspecting system according to an embodiment of the present disclosure.

Referring to FIG. 9, bullet images and casing images are displayed on a left and right side, respectively, of a monitor screen.

Figure 10:
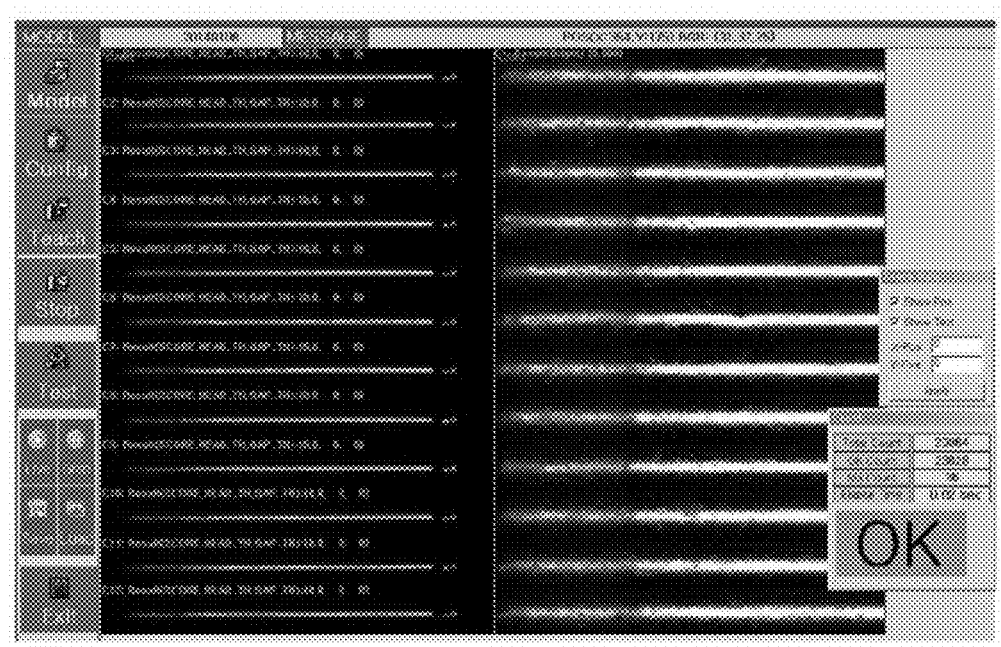
FIG. 10 is a view illustrating a captured image for inspecting discoloring and annealing in an ammunition inspecting system according to an embodiment of the present disclosure.

FIG. 10 is a view illustrating a captured image for inspecting discoloring and annealing in an ammunition inspecting system according to an embodiment of the present disclosure.

Referring to FIG. 10, a left side of FIG. 10 illustrates captured images showing the discoloring of an overall ammunition cartridge and the shape of the extraction groove of the ammunition cartridge, and a right side of FIG. 10 illustrates captured images showing a thermally treated (e.g., annealed) state of an overall ammunition cartridge. Such captured images or information thereon may or need to be gathered for an overall outer circumferential surface of an ammunition cartridge as the ammunition cartridge rotates.

Figure 11:
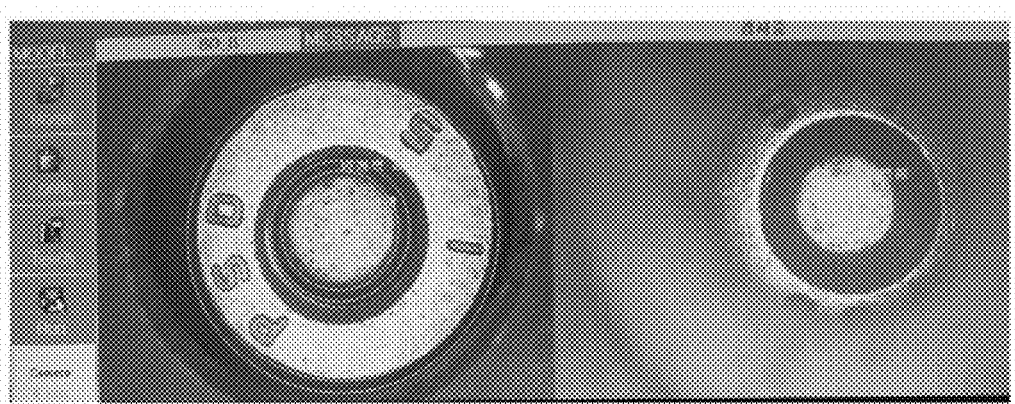
FIG. 11 is a view illustrating a captured image for inspecting a primer and edge of the primer in an ammunition inspecting system according to an embodiment of the present disclosure.

FIG. 11 is a view illustrating a captured image for inspecting a primer and edge of the primer in an ammunition inspecting system according to an embodiment of the present disclosure.

A left side of FIG. 11 illustrates captured images of the bottom surfaces of ammunition cartridges and shows a waterproof or rustproof state of the edge of the primer, and a right side of FIG. 11 illustrates a coupled state of the primer. For obtaining exact images, a difference in depth between the primer itself and the edge of the primer may cause separate cameras to have different focuses.

Figure 12:
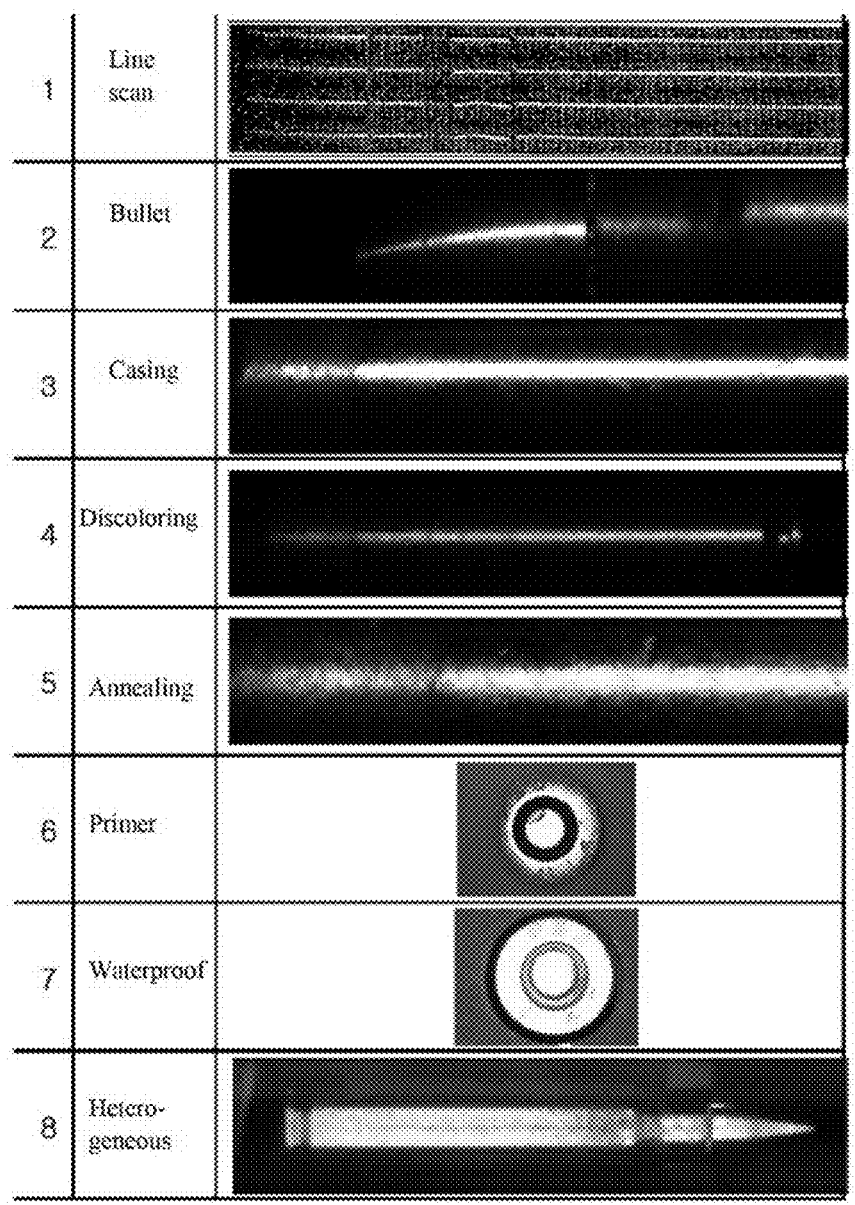
FIG. 12 illustrates a plurality of samples of captured images inspected by an ammunition inspecting system according to an embodiment of the present disclosure.

FIG. 12 illustrates a plurality of samples of captured images inspected by an ammunition inspecting system according to an embodiment of the present disclosure.

Referring to FIG. 12, image samples captured by the above-described eight cameras and their assisting lights are illustrated in a table.

Since an ammunition cartridge may be curved except for a surrounding surface of the primer which is flat, an overall contour of the ammunition cartridge may be difficult to obtain under intense illumination.

According to an embodiment of the present disclosure, the ammunition inspecting system adopts the rotation and revolution of an ammunition cartridge in combination or harmonization. The rotation of the ammunition cartridge enables narrow linear contours of an ammunition cartridge to be continuously captured with the assistance of the lights. The ammunition cartridge may be revolved stepwise, e.g., in predetermined incremental steps, rather than a continuous movement. Thus, the ammunition inspecting system allows for more reliable and efficient ammunition inspection.

According to embodiments of the present disclosure, ammunition cartridges may be inspected for scratches, cuts, dents, discoloring, contamination, or other various defects, and defective or nonconforming ammunition cartridges may be screened out or gathered separately in an easier, quicker, and automated manner.

Embodiments of the present disclosure may be applicable to various types of ammunition regardless of the size or purposes.

While the present disclosure has been shown and described with reference to exemplary embodiments thereof, it will be apparent to those of ordinary skill in the art that various changes in form and detail may be made thereto without departing from the spirit and scope of the present disclosure as defined by the following claims.

What is claimed is:

1. An ammunition inspecting system, comprising:
    a disk-shaped tray wheel having an outer circumferential surface rotated in a vertical direction by a horizontal rotation shaft;
    a plurality of tray units provided on the outer circumferential surface of the tray wheel;
    a tray inserting pusher seating ammunition cartridges on the tray units;
    an ammunition side image capturing module disposed to face the outer circumferential surface of an upper portion of the tray wheel;
    an ammunition actuating roller approaching a tray unit loading a particular ammunition cartridge image-captured by the ammunition side image capturing module, rotating the particular ammunition cartridge, and then escaping off;
    an ammunition discharging module disposed adjacent to a start point of the outer circumferential surface of a lower portion of the tray wheel to receive and convey the ammunition cartridges dropping from the tray units;
    an ammunition bottom image capturing module provided at a side of the upper portion of the tray wheel and including one or more cameras vertically image-capturing bottom surfaces of the ammunition cartridges seated on the tray units; and
    an ammunition recovering module provided at a side of the upper portion of the tray wheel and pushing the ammunition cartridges out of the tray units in a direction perpendicular to a revolving direction thereof and perpendicular to an image capturing direction of the ammunition side image capturing module, wherein the ammunition side image capturing module includes at least one first camera image-capturing the particular ammunition cartridge rotated as the ammunition actuating roller approaches, a first ammunition side light assisting in the image-capturing of the first camera, at least one second camera image-capturing the particular ammunition cartridge after the ammunition actuating roller escapes off and the particular ammunition cartridge undergoes a predetermined revolution, and a second ammunition side light assisting in the image capturing of the second camera.

2. The ammunition inspecting system of claim 1, wherein the tray inserting pusher is provided adjacent to the start point of the outer circumferential surface of the upper portion of the tray wheel, wherein the ammunition bottom image capturing module includes a primer camera and a primer edge camera arranged to image-capture, at different focal lengths, bottom surfaces of ammunition cartridges seated on different tray units, and wherein the ammunition side image capturing module includes a line scan camera, a bullet camera, a casing camera, a discoloring camera, and an annealing camera image-capturing an overall outer circumferential surface of the particular ammunition cartridge while the particular ammunition cartridge rotates, and the ammunition side image capturing module further includes a heterogeneous ammunition camera image-capturing a portion of the outer circumferential surface after the particular ammunition cartridge stops rotating and then undergoes the predetermined revolution.

* * * * *